UNITED STATES PATENT OFFICE.

LEVI BERNARD MILLARD, OF SAN JOSÉ, CALIFORNIA.

IMPROVEMENT IN MEDICAL COMPOUNDS.

Specification forming part of Letters Patent No. 133,328, dated November 26, 1872; antedated November 16, 1872.

*To all whom it may concern:*

Be it known that I, LEVI BERNARD MILLARD, of the city of San José, in the county of Santa Clara, and State of California, have invented a new and useful Medical Compound; and I do hereby declare that the following is a full and exact description of the same.

The object of my invention is to provide an improved medical compound or medicine, which is principally valuable for the treatment of coughs, colds, catarrh, asthma, bronchitis, consumption, liver complaint, and all similar diseases or complaints; and it consists in the employment of a certain herb so prepared by decoction or distillation as to extract its valuable properties and present them in such a form that it can be taken as an internal remedy.

This herb is the woodbine, (*caprifolium periclymenum*,) and I employ preferably the wild variety, as I have found this to have the most rapid and beneficial effect.

When possible I prefer to gather it in the autumn, as it then bears a berry which adds materially to its value, but it may be gathered at any convenient season, and will always be found beneficial.

The leaves, branches, stalks, and roots are cut up or otherwise reduced, and placed in a suitable vessel with water; and the whole is thoroughly boiled, so as to extract all the properties of the herb and form a strong decoction, which I have found in practice to be very suitable. It is, however, equally valuable, and sometimes better, to distil a product over, which, when condensed into a proper receiver, will be found to have great strength, and it will be clearer and in some cases better adapted to the purpose. If desired, a small quantity of sugar-sirup or flavoring extract may be added to render it palatable; and it will be necessary to add a small proportion of alcohol or spirits to prevent souring, if it is to be kept for some time.

It may be found better to make an extract or distillate altogether by means of spirits; but I have thus far found that when made with water it answers every purpose.

Having thus described my invention, what I claim, and desire to secure by Letters Patent, is—

A medicine for coughs, colds, &c., prepared of the ingredients substantially as herein described.

In witness whereof I have hereunto set my hand.

LEVI B. MILLARD.

Witnesses:
E. P. McQUESTEN,
JOHN L. SMITH.